July 9, 1940.   G. WOLFF   2,207,186
DEGREASING APPARATUS
Filed May 25, 1936
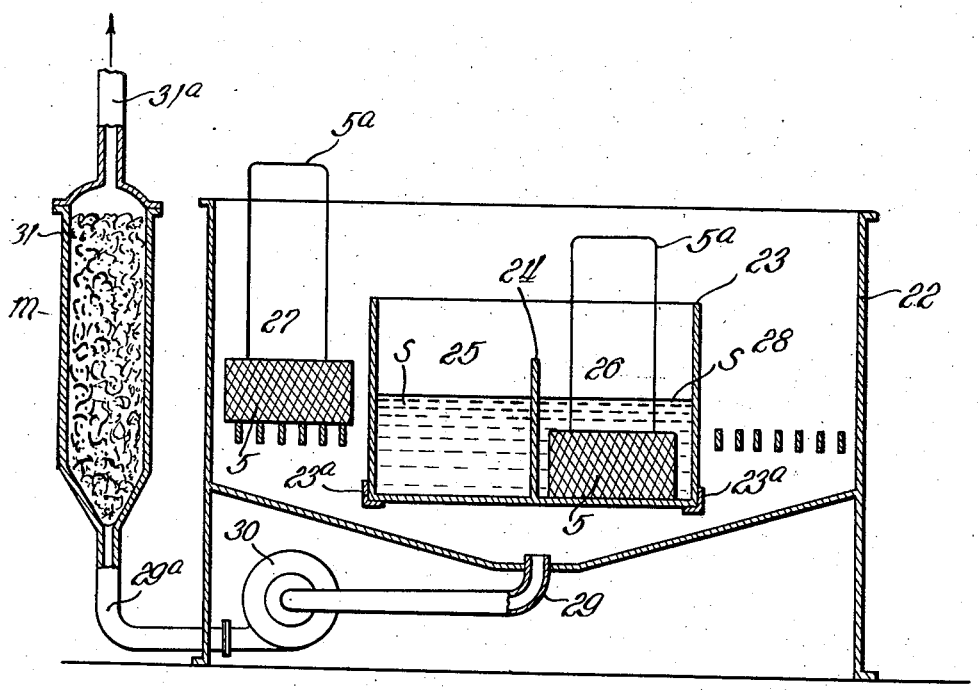
Inventor:
Georg Wolff
By Brown, Jackson, Boettcher & Dienner
Attys.

Patented July 9, 1940

2,207,186

UNITED STATES PATENT OFFICE 2,207,186

DEGREASING APPARATUS

Georg Wolff, Munich, Germany, assignor to Dr. Alexander Wacker Gesellschaft für Elektro-Chemische Industrie, G. m. b. H., Munich, Germany Application May 25, 1936, Serial No. 81,709
In Germany November 7, 1935

1 Claim. (Cl. 141—1)

This invention relates to the cleaning of various articles, and has to do with an apparatus for degreasing and cleaning metal articles and the like.

It is known to degrease metal articles by subjecting them to the action of volatile organic solvents, particularly chlorinated hydrocarbons such as trichlorethylene, perchlorethylene, tetrachlorethylene, etc. The vapors of these chlorinated hydrocarbons are heavier than air and, when mixed with air, are injurious if breathed. In the use of the degreasing solvents referred to the solvent is commonly heated to the boiling point of water, or higher, in suitable containers or casings which are open at their top for insertion and removal of the articles being treated, and vapors of the solvent are evolved in considerable volume. In order to prevent escape of these vapors to the atmosphere cooling means is provided above the upper portion of the casing for chilling and condensing the vapors, the condensate being deposited within the casing. Apparatuses of this character have come into extensive use and have proved to be highly efficient and economical in industrial processes, in which the use of the apparatus is continuous or substantially so. There are many places, however, such as repair shops, garages, etc., in which the use of degreasing apparatus would of necessity be intermittent and the apparatus might be out of use for considerable lengths of time. In such cases there would inevitably be loss of solvent by evaporation and the use of the apparatus becomes less economical. Also, there are many articles which would be injuriously affected by the heat of the solvent which, as above noted, is commonly heated to an appreciably high temperature in apparatuses of the type now commonly used, above referred to.

The instant invention is directed, in general, to the provision of apparatus particularly suitable for intermittent treatment of articles as well as for treatment of articles which are susceptible to injury if subjected to appreciable heat, and to apparatus for practicing such process. More specifically, my invention is directed to an apparatus for degreasing articles without necessity of heating the solvent to an appreciably high temperature, which treatment may therefore be termed a cold treatment, and such that the treatment may be performed intermittently and with increased economy and escape of solvent vapors to the atmosphere is effectively prevented. Further objects and advantages of my invention will appear from the detail description.

The single figure of the drawing is a transverse vertical sectional view of an apparatus embodying my invention.

In the apparatus shown an open top tank 23 is suitably supported, as by means of angle members 23a, within casing 22. The bottom of tank 23 is spaced above the bottom of casing 22 and this tank is divided by a partition 24 into two compartments 25 and 26 each of which contains an appropriate body of a volatile degreasing solvent, such as trichlorethylene, the vapors of which are appreciably heavier than air. Tank 23 is spaced away from the side walls of casing 22 and defines, with the side portions of the casing, side drying compartments 27 and 28 which open at their lower ends into the space beneath tank 23. A conduit 29 opens through the bottom of casing 22, beneath tank 23, this conduit being connected to the intake of a centrifugal suction fan 30 the discharge of which is connected by a conduit 29a to a container 31 from the upper end of which extends an outlet conduit 31a. The container or vessel 31 is in the form of a tower and is substantially filled with a suitable material m of a character which readily absorbs the solvent vapors, such as rags soaked with oil, coal, or other suitable material. This material may be removed from the container at appropriate times and the solvent recovered therefrom in a known manner.

The tank 23 serves, in effect, as a partition structure for separating the interior of casing 22 into degreasing and drying compartments. It will be noted that the upper edge of this tank is an appreciable distance below the top of casing 22, this distance being greater than the height of basket 5 of reticulated construction provided with an elongated inverted U-shaped handle 5a, and partition 24 is of such height that its upper edge is an appreciable distance below the top of tank 23. In the use of this apparatus the articles placed within basket 5, are immersed in the solvent within compartment 25 or 26 of tank 23, and are then withdrawn, the basket being placed upon the supporting bars 6 within one of the drying compartments. The fan 30 induces down flow of air through compartments 27 and 28 thus quickly drying the articles placed within these compartments, this flow of air also serving effectively to prevent escape of solvent vapors to atmosphere through the open top of casing 22.

What I claim is:

In a degreasing and drying apparatus of the character described, a casing open at its top, a tank open at its top within said casing and spaced from the side and bottom walls thereof, the top of said tank being below the top of said casing, a partition within said tank having its upper edge below the top of the tank and dividing the latter into two compartments for containing a volatile degreasing solvent the vapors of which are heavier than air, said tank defining with the side portions of said casing two drying compartments, means within said drying compartments for supporting degreased articles to be dried, and suction means having its intake connected to said casing beneath said tank effective for inducing air and solvent vapors downward through said drying compartments in the operation of the apparatus.

GEORG WOLFF.